R. M. WATSON.
LOOSE LEAF BINDER.
APPLICATION FILED FEB. 6, 1913.

1,089,734.

Patented Mar. 10, 1914.

WITNESSES
Robert N. ...
Virginia C. Spratt,

INVENTOR
Richard M. Watson
BY
Ralzemond A. Parker
ATTORNEY

UNITED STATES PATENT OFFICE.

RICHARD M. WATSON, OF DETROIT, MICHIGAN, ASSIGNOR OF ONE-HALF TO OTTO P. SENZIK, OF DETROIT, MICHIGAN.

LOOSE-LEAF BINDER.

1,089,734.

Specification of Letters Patent. Patented Mar. 10, 1914.

Application filed February 6, 1913. Serial No. 746,423.

*To all whom it may concern:*

Be it known that I, RICHARD M. WATSON, a citizen of the United States, residing at Detroit, county of Wayne, State of Michigan, have invented a certain new and useful Improvement in Loose-Leaf Binders, and declare the following to be a full, clear, and exact description of the same, such as will enable others skilled in the art to which it pertains to make and use the same, reference being had to the accompanying drawings, which form a part of this specification.

This invention relates to loose-leaf binders and has for its object a loose-leaf binder in which the pairs of clips are adjustably spaced from each other.

Figure 1:
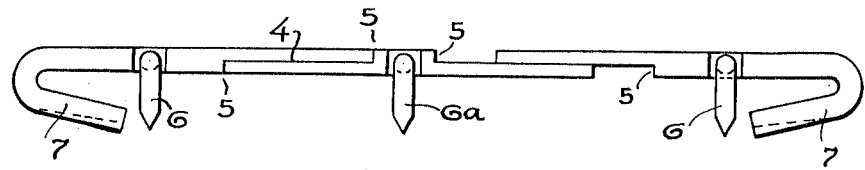
Figure 2:
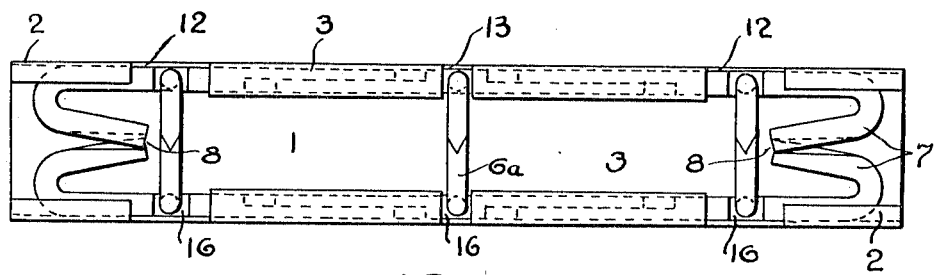
Figure 3:
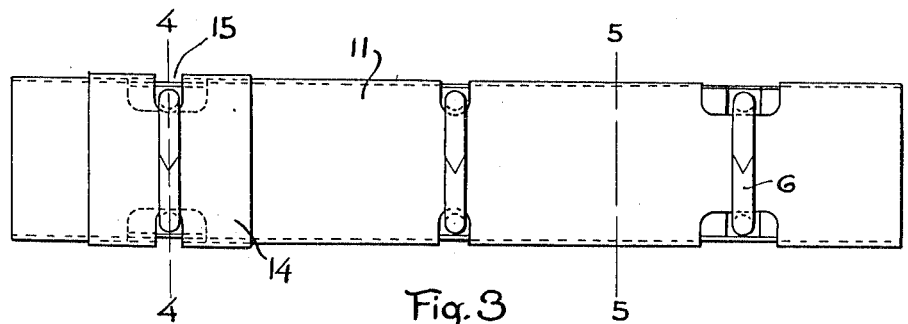
Figure 5:
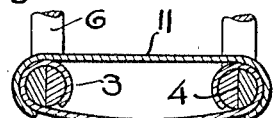
Figure 4:
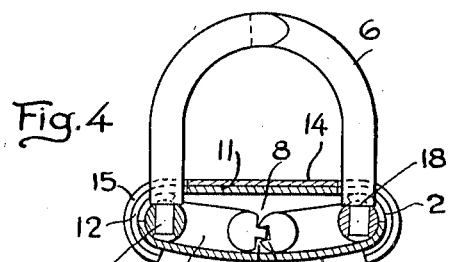

In the drawings: Figure 1, is an elevation of one of the adjustable bearings. Fig. 2, is a plan view of the binder with the cover plate and the cap plates removed. Fig. 3, is an elevation of the completed binder, one of the cap plates being removed. Fig. 4, is a section on the line 4—4 of Fig. 3. Fig. 5, is a section on the line 5—5 of Fig. 3.

1 indicates the base plate which is formed by turning over the edges of a strip of metal as at 2 to form journal bearings for the clip bearings. These journal bearings at 3 are turned substantially completely back upon the metal of the base plate as indicated in Fig. 5 so as to form tubular journals that are adapted to incase the split clip-bearings 4. These clip-bearings 4 are split longitudinally as shown in Fig. 1 and provided with shoulders 5 at each end of the split to limit the longitudinal movement in one direction. This allows the two adjoining clip-bearing members to be lengthened or shortened so that the clips 6 may be inserted in perforations of the paper that are spaced different distances. At the same time each of the clips is positively connected with the other clips on that side so that their action is in the same manner as though the clips were connected with a solid wire.

In the form of clip bearing and clip shown in Fig. 1, there are two splits in the clip-bearing. This is a three-clip bearing. Where only two clips are used, there is need only of one split in the clip-bearing. This clip-bearing 4 I prefer to use in the form of wire that is bent back upon itself at the ends 7 forming hook portions which meet in a toggle as at 8. The hook portions are held in this relation by the use of a tooth 9 and a recess 10 that interengage. The resilience necessary to keep the clips in open or closed position is afforded in the wires in the manner that I have described in some of my former applications. Or the resiliency may in part or in whole reside in the back or base plate. In the forms that I have shown in Figs. 4 and 5, the resiliency is resident in the wires so that a flat cover plate 11 may be employed.

Referring to Fig. 2, it will be noticed that the journal bearings do not extend the entire length of each side, but there are cut-away portions at 12 of some length which allows the sliding of the end clips toward or from each other and still give space at such newly adjusted position to open out. Inasmuch as the middle clip 6ª always remains in the same location, it is not necessary to have a long cut-away portion adjacent it so there is but a short cut-away portion 13 that allows the opening out of the clips. In connection with each end pair of clips, I employ a cap plate 14 which serves to cover up the long cut-away portions 12 and also, by the friction that it produces in contacting the cover plate, helps to hold the half-rings in any given position of adjustment. These cap plates 14 have short cut-away portions 15 to allow the opening up of the clips.

Examination of Fig. 4 will disclose that the clips 6 rise perpendicular from the plane of the base plate. Instead of the clips being half-rings as is customary, I employ straight posts that are arched at their tops. The clips are assembled into the clip-bearings by swaging the clip-bearing as at 16 so as to make it flat. The posts 6 have reduced portions 17 that may be put through the bores that are made in the clip-bearings at the swaged portion and then be set so as to rivet them on the shoulder 18 formed at the juncture of the post and the reduced portion 17. Against the shoulder 18 abuts the flat swaged portion 16 of the clip bearing and holds the post in its perpendicular relation with respect to the plane of the base plate. This is a distinct advantage inasmuch as when the rings are closed, which is the relation in which they are most commonly employed, the posts do not form with any other portions of the structure, acute angles which may hinder the turning of the leaves or which may suffice to tear them, but all the angles are right angles and there is little if no chance of the leaves becoming wedged therein or torn. The leaves are not tilted by the curved bases of the clips when the book is opened out as is the case with the ordinary binder.

What I claim is:—

1. In a loose-leaf binder, the combination of a base-plate, clip-bearings rotatably supported in the base plate, clips carried thereon, each clip-bearing operatively connecting the clips on one side of the base plate and being in itself extensible and contractible in its length to vary the spacing of the clips, substantially as described.

2. In a loose-leaf binder, the combination of a base plate, clip-bearings rotatably supported in connection with the base plate, the said clip-bearings being divided into one or more sections, the said sections having overlapping and abutting faces, and a clip supported on each clip-bearing section whereby one pair of clips is operatively connected with another pair of clips and the pairs of clips are adjustable with respect to each other, substantially as described.

3. In a loose-leaf binder, the combination of a base plate provided with edges turned over to form tubular journal bearings, wire clip-bearings that are divided into one or more sections, the said sections having overlapping and abutting faces, and a clip rising from each clip-bearing section, the said overlapping portions of the sections being contained in the tubular journal bearings so that the pairs of clips are adjustable with respect to each other, but are operatively connected with each other, substantially as described.

4. In a loose-leaf binder, the combination of a base plate, tubular bearings supported along parts of the length of the base plate, clip bearings journaled in said tubular bearings and comprising sections having overlapping and abutting faces, clips attached to the clip-bearing sections, which are adjustable one pair of clips with respect to another on account of the overlapping and abutting sections contained in the tubular bearings, a cover plate adapted to fit over the base plate and provided with cut-away portions that are adjacent to the portions of the base plate wherein there are no tubular bearings, and a cap plate for each adjustable pair of clips adapted to conceal the cut-away portions of the cover plate, substantially as described.

5. In a loose-leaf binder, the combination of a base plate, tubular bearings supported along parts of the length of the base plate, clip bearings journaled in said tubular bearings, the said clip bearings being cylindrical members that are divided into sections by splits which run transversely of the member to the center, then lengthwise of the member and thence transversely to the other side, the said splits forming overlapping portions of the sections which are contained in the said tubular bearings, and clips supported on the respective bearing sections, substantially as described.

In testimony whereof, I sign this specification in the presence of two witnesses.

RICHARD M. WATSON.

Witnesses:
 STUART C. BARNES,
 AMELIA C. KOEHN.